United States Patent [19]

Sedlacek et al.

[11] Patent Number: 4,640,228

[45] Date of Patent: Feb. 3, 1987

[54] ANIMAL CAGE ASSEMBLY WITH REUSABLE FILTER CAP

[75] Inventors: Robert S. Sedlacek, Stoneham, Mass.; Neil Campbell, Hasbrook Heights, N.J.

[73] Assignee: Lab Products, Inc., Maywood, N.J.

[21] Appl. No.: 653,325

[22] Filed: Sep. 24, 1984

Related U.S. Application Data

[63] Continuation-in-part of Ser. No. 422,355, Sep. 23, 1982, Pat. No. 4,480,587.

[51] Int. Cl.⁴ .............................................. A01K 1/03
[52] U.S. Cl. ........................................ 119/15; 119/17
[58] Field of Search ................... 119/15, 17; 220/371, 220/372

[56] References Cited

U.S. PATENT DOCUMENTS

| | | | |
|---|---|---|---|
| 3,304,913 | 2/1967 | Nesher | 119/15 |
| 3,343,520 | 9/1967 | Schwarz, Jr. | 119/15 |
| 3,537,428 | 11/1970 | Montgomery | 119/15 X |
| 3,580,219 | 5/1971 | Stebbins | 119/17 X |
| 3,791,346 | 2/1974 | Willinger et al. | 119/15 X |
| 4,112,984 | 9/1978 | Guglia et al. | 220/371 X |

Primary Examiner—Robert P. Swiatek
Attorney, Agent, or Firm—Thomas R. Morrison

[57] ABSTRACT

A cage assembly for small laboratory animals includes a cage having an open-top transparent body and optionally a containment member within the cage body to confine the animals. A filter cap for biologically isolating the encaged animals from the surrounding environment is disposed on the cage. The filter cap has a rigid transparent housing which rests upon and encompasses the cage. The marginal portion of the filter cap overhangs the marginal portion of the cage to prevent the filter cap from being dislodged from the cage. The filter cap has a perforated top wall against the under surface of which an air filter is detachably secured by retainer member which snaps into mounted position in which the filter is sandwiched between the perforated top wall and the retainer member, with the top wall protecting the filter against damage during handling of the filter cap.

17 Claims, 13 Drawing Figures

ANIMAL CAGE ASSEMBLY WITH REUSABLE FILTER CAP

This application is a continuation-in-part of my pending U.S. patent application, Ser. No. 422,355, filed Sept. 23, 1982 and entitled ANIMAL CAGE ASSEMBLY WITH REUSABLE FILTER CAP and now U.S. Pat. No. 4,480,587.

BACKGROUND OF THE INVENTION

The present invention relates to caging systems for housing and isolating laboratory animals, and in particular to cage assemblies for the breeding of colonies of mice, rats or other small laboratory animals or for laboratory experimental work with such animals. Each of the cage assemblies includes a see-through cap or bonnet which has a detachable reusable filter, and remains securely in place on the cage body without being fastened thereto, to function as an effective microbiological barrier.

In the production of colonies of mice or other small laboratory animals by breeding, the mice are housed in animal cages which are arranged in close proximity within confined areas. The colonies are subject to airborne diseases which spread rapidly from one cage to another, particularly where the surrounding environment is not particularly sanitary. It is particularly desirable to maintain a closed, limited Defined Flora colony, that is a colony of mice having a limited number of bacteria which are constantly the same. It has hitherto been impossible to maintain a constant flora over long periods of time without employing complex isolator systems which are expensive and not economically feasible in the breeding production of laboratory mice.

The same problems are encountered in the maintenance of the animals during laboratory experimental work. Although the surrounding environment is more sanitary, the animals are housed in open cages which are arranged to close proximity to each other, usually, on multi-tier racks. The animals in the different cages may be infected with various selected diseases while others may be uninfected for comparison purposes. It has been difficult or impossible to prevent the spread of diseases from one cage to another without employing complex isolator systems.

Conventional cages for small laboratory animals are usually of the open-mesh type in which the cage side and bottom walls are made of wire grill or perforated metal, or of the "shoe-box" type having solid imperforate side and bottom walls made of transparent plastic material, and an open top. The cage assembly of the invention herein is directed to the latter type of "shoe-box" transparent cage body, in combination with a filter cover therefor. The cage body may include a removable lid made of a grid of straight spaced bars, and shaped to contain hoppers for the storage of food and water which are easily accessible to the animals within the cage. The term "cage", as used in this description, generally refers to a cage body or tray having solid side and bottom walls and an open top, with the optional inclusion of a grid-type lid overlaying the open top and having means for mounting water and food containers.

In the use of such cages for animal production or experimental laboratory research, it is imperative that bacteriological conditions established in an individual cage be maintained for as long as such conditions are desired. It is also desirable to have a clear view of the animals through any top cover provided for the cage, since other portions of the cage are occasionally obstructed.

In my aforementioned prior patent application Ser. No. 422,355 there is shown an animal cage filter cap which is constructed to be removably mounted in secure position upon standard animal cages having transparent walls, and which provides with the cage an effective microbacterial barrier for the animals housed therein, and minimize the emission of odors from the cage by maintaining limited defined anaerobic bacterial flora. The filter cap is reusable and mounts a removable and reusable filter, both the cap body and filter being capable of being autoclaved. The filter cap is transparent so that the housed animals may be observed therethrough, and is in the shape of a box-like enclosure sized to fit upon the open top end of the animal cage in overlapping relationship with the cage wall. The filter cap has a resting surface which is formed to engage a corresponding surface portion of the cage to effect a substantial seal like a petri dish between the cap and the cage.

The cage cap of my aforementioned patent application Ser. No. 422,355 includes an autoclavable filter in the form of a thin sheet which overlies the open top end of the cap body and which admits filtered air into the enclosed assembly. The filter is detachably mounted on the cage cap so that it may be removed when necessary for separate sterilization or for replacement. The filter is covered over by a perforated metal plate which protects the filter from damage during handling of the cage cap, and the metal plate and underlying filter are attached to the cap by bolts and nuts.

The animal cage filter cap of the present invention is identical in general structure and function to the filter cap described above and provides all of the aforementioned advantages. It includes, however, improved means for detachably mounting the filter on the cap body. The perforated metal plate and the bolts and nuts are replaced by an integral perforated top wall on the cage body, and a plastic retainer member detachably secures the filter in mounted position upon the cap body by a snap fit, with the filter sandwiched between the perforated top wall and the retainer member.

It is the principal object of the present invention to provide an animal cage filter cap of the character described which includes novel means for mounting the filter on the cap body so that the filter can be quickly removed and replaced, minimizing the time in which the animals within the cage are exposed to an unfiltered environment.

Another object of the invention is the provision of an animal cage filter cap of the character described which is rigid, durable, inexpensive to produce, easy to sterilize for reuse, easy to handle, uses minimal rack space, does not dislodge when adjacently-disposed cages are pushed against one another, and allows easy access to selected cages without time-consuming entry procedures.

SUMMARY OF THE INVENTION

In accordance with the present invention, there is provided a filter cap for an open-top animal cage, which filter cap is in the shape of a box-like enclosure having a transparent rigid body portion sized to fit upon and cover over the open top of the animal cage in overlapping relationship with the cage wall. Flange means extends around the periphery of the open bottom end of the filter cap body portion and includes a lateral flange portion sized and positioned to rest upon the top surface of the animal cage when the filter cap is inserted thereon, to effect a substantial peripheral seal between the filter cap and the cage, in the manner of a petri dish. The flange means also includes a continuous skirt portion which depends from said lateral flange portion and is sized to closely encompass the open top of the cage in such a manner that the filter cap overhangs the cage and cannot be dislodged therefrom.

The filter cap has a perforated top wall which in use is covered by detachable air filter means. The air filter means comprises a sheet of filter material sized to fit closely within the upper end of the cap body portion against the perforated top wall. The filter cap is also provided with support means which underlies the sheet of filter material and supports the same in a mounted position in which the sheet is sandwiched between the retainer member and the perforated top wall, and is also provided with means for detachably securing the support means to the body portion with the supports means pressing the sheet of filter material firmly against the perforated top wall.

Additional objects and advantages of the invention will become obvious during the course of the following specification when taken in connection with the accompanying drawings, in which:

DESCRIPTION OF THE PREFERRED EMBODIMENTS

Figure 1:
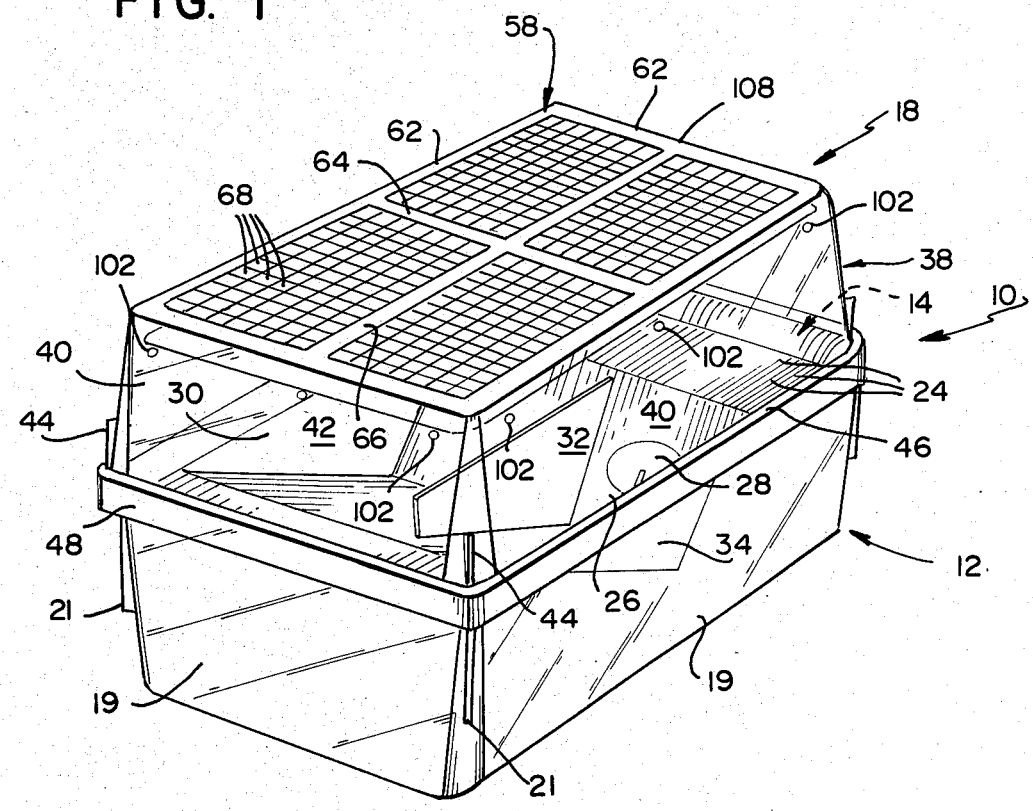
FIG. 1 is a perspective view of an animal cage assembly incorporating one embodiment of the present invention.

Referring in detail to the drawings, a cage assembly incorporating the filter mount of the present invention is generally referred to by the reference number 10 in FIG. 1.

The cage assembly 10 comprises a box-like animal cage 12 with a cage lid or containment member 14 supported on a peripheral lip 16 of the cage 12. The term "cage", as used herein, generally refers to the combination of the cage bottom 12 and the cage containment member 14, although incorporation of the latter in the assembly 10 is optional. The cage assembly 10 also includes a filter cap 18 which covers the cage 12 and the cage containment member 14.

The cage 12 is formed with integral side walls 19, a bottom wall or floor 20 and an open top end. The walls are preferably formed of a clear transparent plastic such as polycarbonate, which is rigid, durable, permits ready inspection of animals, has a high impact strength, and is machine washable or autoclavable at temperatures under 250 degrees F. Such a cage is conventional, commercially available, and widely used. A standard absorbent bedding of particulate material such as wood chips (not shown) may be spread on the floor 20 (FIG. 2) of the cage 12. The open top of the cage 12 is bordered by the lip 16 which extends continuously therearound. The cage 12 also includes corner reinforcements 21.

Figure 2:
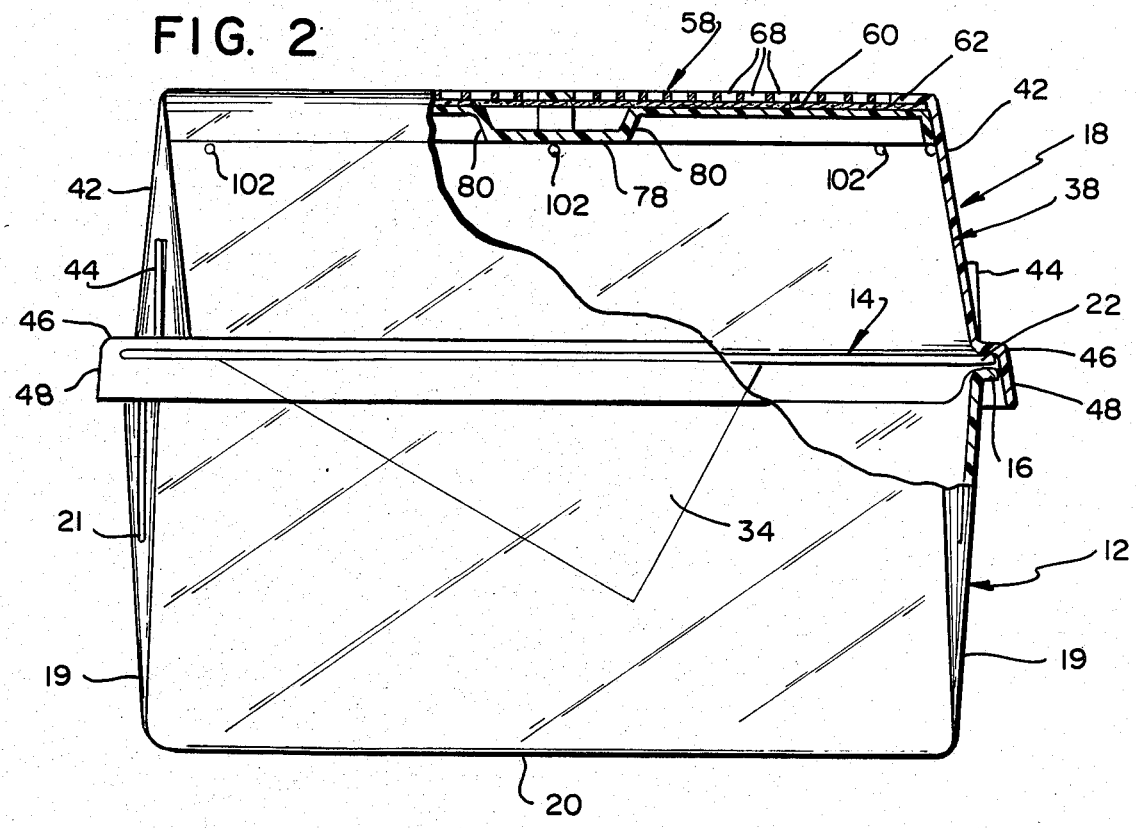
FIG. 2 is a side view of the animal cage assembly of FIG. 1, with a portion thereof broken away and shown in section.

The cage lid or containment member 14 shown in FIGS. 1 and 2 is disclosed in U.S. Pat. No. 3,358,649 to which reference is made for further disclosure. The lid 14 is essentially a bar construction formed of stainless steel for example, and comprises an outer rim 22 which is disposed on the lip 16 of cage 12. A plurality of bars 24 extend across the rims 22. The cage lid or containment member 14 is employed to mount containers for food and water in a position in which they are readily accessible to the animals within the cage. For this purpose, some of the bars 24 are depressed and bent angularly to form a water bottle compartment 26 with a bottle support 28 and a food compartment 30. The compartments 26 and 30 are divided by a swingable divider panel 32 and are bordered by end panels 34.

The filter cap 18 comprises a body portion 38 in the general shape of a deep tray or box. The body portion 38 is preferably formed of clear plastic such as polycarbonate having the properties previously described for the cage bottom 12. The body portion 38 includes respective opposed side walls 40, 40, and end walls 42, 42, with corner reinforcements 44 at the intersections of the walls 40 and 42. Surface means on the body portion 38 for resting the filter cap 18 on the cage 12 include a continuous lateral peripheral flange 46 extending perpendicularly outwardly from the walls 40 and 42. Means on the body portion 38 for encompassing the cage 12 include a continuous peripheral flange 48 depending from the lateral peripheral flange 46.

As shown in FIG. 2, the flange 48 is spaced from, encompasses and overhangs the lip 16 of the cage 12. Thus, the filter cap body portion 38 cannot be dislodged from the cage 12 and must be lifted off to be removed. It should also be noted that the clearance space between the flange 48 and the lip 16 permits only a slight movement of the filter cap 18 on the cage 12. However, the peripheral flange 46 is of sufficient lateral extent to remain in contact with the cage lip 16 or with its overlying lid 14 despite any relative lateral movement between the filter cap 18 and the cage 12, to maintain the integrity of the seal between the filter cap and the cage.

The structure of the cage assembly this far described is identical to that shown and described in my aforementioned patent application Ser. No. 422,355. In the latter application, the filter cap body portion is formed with a top open end and means is provided for detachably securing an air filter sheet in a position in which it overlies the top open end of the filter cap body portion. For this purpose, the top open end of the filter cap body portion is bordered by a narrow ledge interconnected by cross arms, which ledge and cross arms support the air filter atop the filter cap. A perforated metal plate is laid over the mounted air filter and is removably secured to the filter cap body portion by a plurality of bolts and nuts. During use of the filter cap, the bolts and nuts may be removed for disassembling and removing the filter sheet and metal plate member for individual cleaning, sterilization or replacement. In use of the assembled filter cap, the perforated metal plate overlies the air filter sheet in flush abutment therewith, to protect the filter against damage during handling and prevent its buckling, while the filter rests flush upon the peripheral ledge and cross arms of the top open end of the filter cap body portion.

The filter cap of the present invention incorporates filter mounting means which are an improvement over the mounting means described above. No perforated metal plate is provided, resulting in an economy of manufacture. Further, no screws or nuts are employed in mounting the filter, but instead the filter is detachably secured to the top of the filter cap body portion by a snap-fitting insert, so that it may be more quickly and easily removed and replaced.

As shown in the drawings herein, the filter cap 18 has a perforated top wall 58 and is provided with means for detachably securing an air filter 60 in a position in which it underlies the perforated top wall 58, and for supporting said filter 60 immovably in mounted position.

The filter 60 is a thin sheet of spun-bonded polyester of the type sold by Du Pont under the Trademark REEMAY 20-24. A filter thickness of between 11 and 13 mils has been found adequate for a filter having an area approximately equivalent to the area of the filter cap top wall 58.

Figure 7:
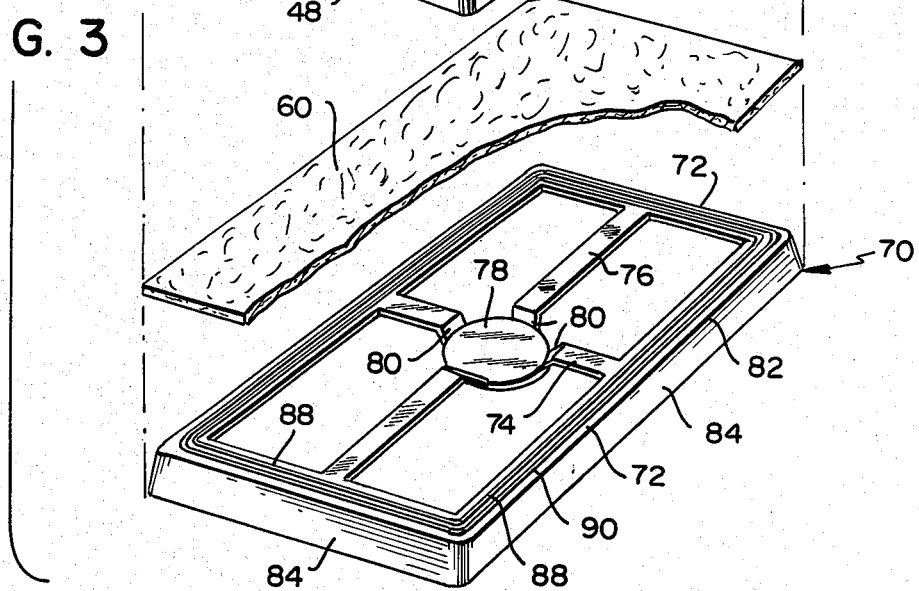
FIG. 7 is an enlarged fragmentary top plan view of a portion of the top wall of the cap lid shown in FIGS. 1 and 3.

The top wall 58 of the filter cap 18 is integrally molded with the filter cap body portion 38 to provide a marginal narrow ledge or flange 62 which extends continuously around the top of the filter cap and borders the latter. Central narrow cross arms 64 and 66 are molded integrally with the ledge 62 and intersect at the center of the top wall 58, dividing the same into four rectangular sections shown in FIGS. 1 and 3. These rectangular sections are each provided with a plurality of perforations 68 of square configuration and forming a grid array, as best shown in FIG. 7.

The filter 60 is mounted inside the filter cap body portion 38 and is held in place by means of a retainer member 70 in a manner to be presently described.

Figure 3:
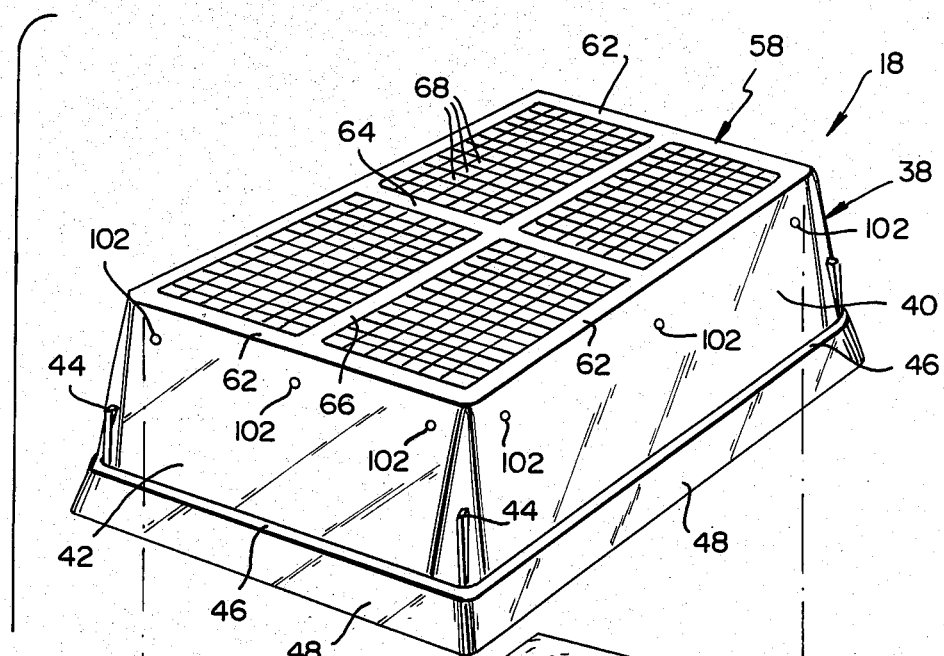
FIG. 3 is an exploded perspective view of the cap lid of the assembly of FIG. 1.
Figure 8:
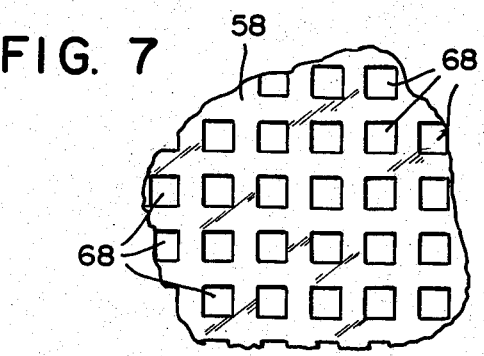
FIG. 8 is an enlarged sectional view of the center portion of the retaining member, taken along line 8—8 of FIG. 4.
Figure 4:
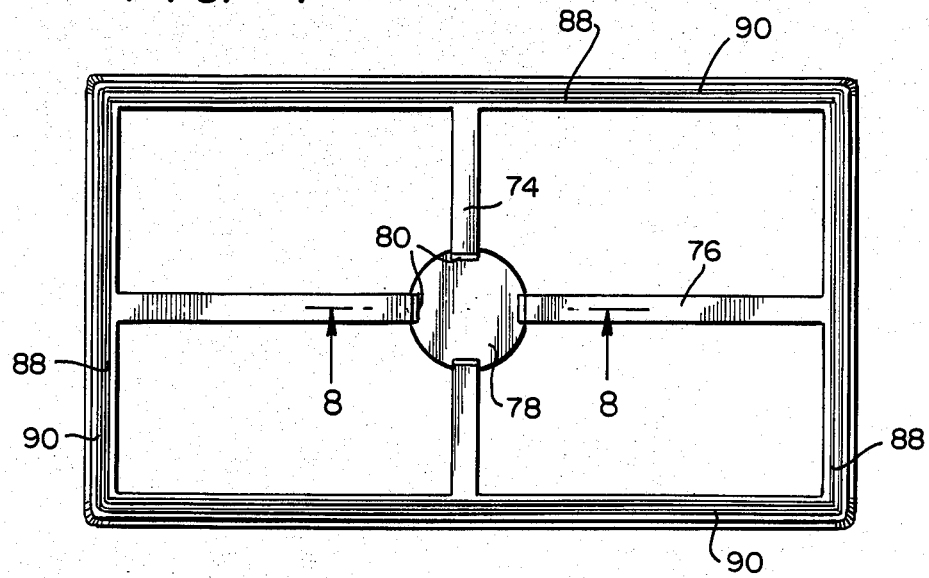
FIG. 4 is a top plan view of the retainer member of the animal cage assembly of FIG. 1.

The retainer member 70 is shown in detail in FIGS. 3-7 and 8, and comprises a narrow border portion 72 which is generally rectangular, and flat cross arms 74 and 76 which are molded integrally with the border portion 72 and which intersect at an integral central portion 78 which is circular. The central portion 78 is recessed a short distance below the plane of the cross arms 74 and 76 by integral angled arm extensions 80, as is best shown in FIGS. 3 and 8.

Figure 5:
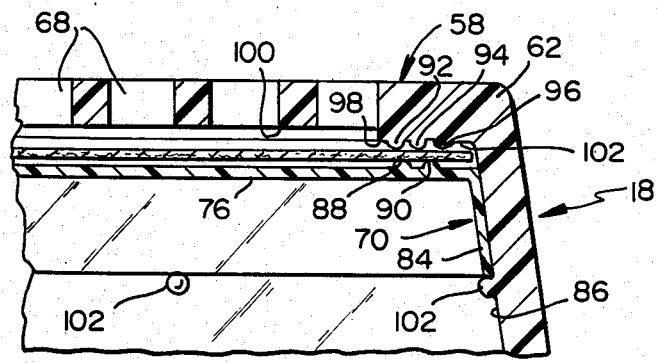
FIG. 5 is an enlarged fragmentary sectional view of one end of the cap lid of the assembly of FIG. 1 with the components of the lid shown in an assembled state.

The outer edge 82 of the border portion 72 is joined to an integrally molded peripheral flange 84 which depends therefrom and extends continuously around the border portion 72, and which closely fits the inner surface 86 of the filter cap body portion 38, as shown in FIG. 5. The top surface of the border portion 72 is formed with a pair of spaced-apart integrally molded ridges 88, 90 which extend continuously around the border portion. Each ridge 88, 90 has a generally convex cross-section as shown in FIG. 6, and the ridges are disposed to project between a group of three similarly-shaped spaced-apart ridges 92, 94 and 96, which are integrally molded on the bottom surface 98 of the filter cap ledge 62.

Figure 6:
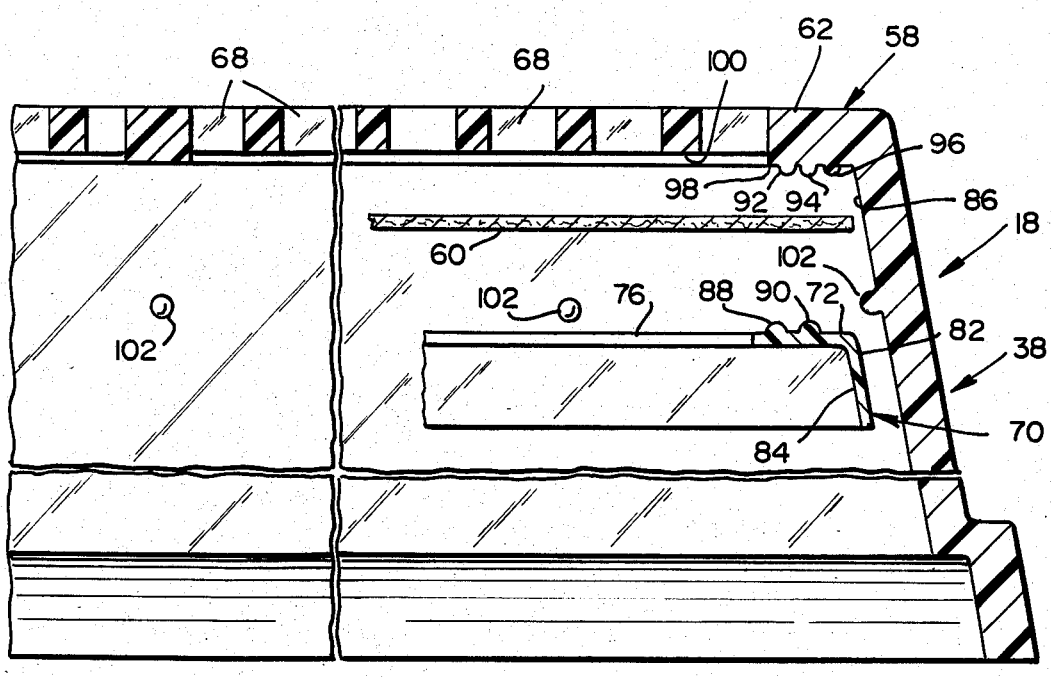
FIG. 6 is a sectional view of the cap lid similar to FIG. 5, but with the components of the cap lid shown disassembled.
Figure 9:
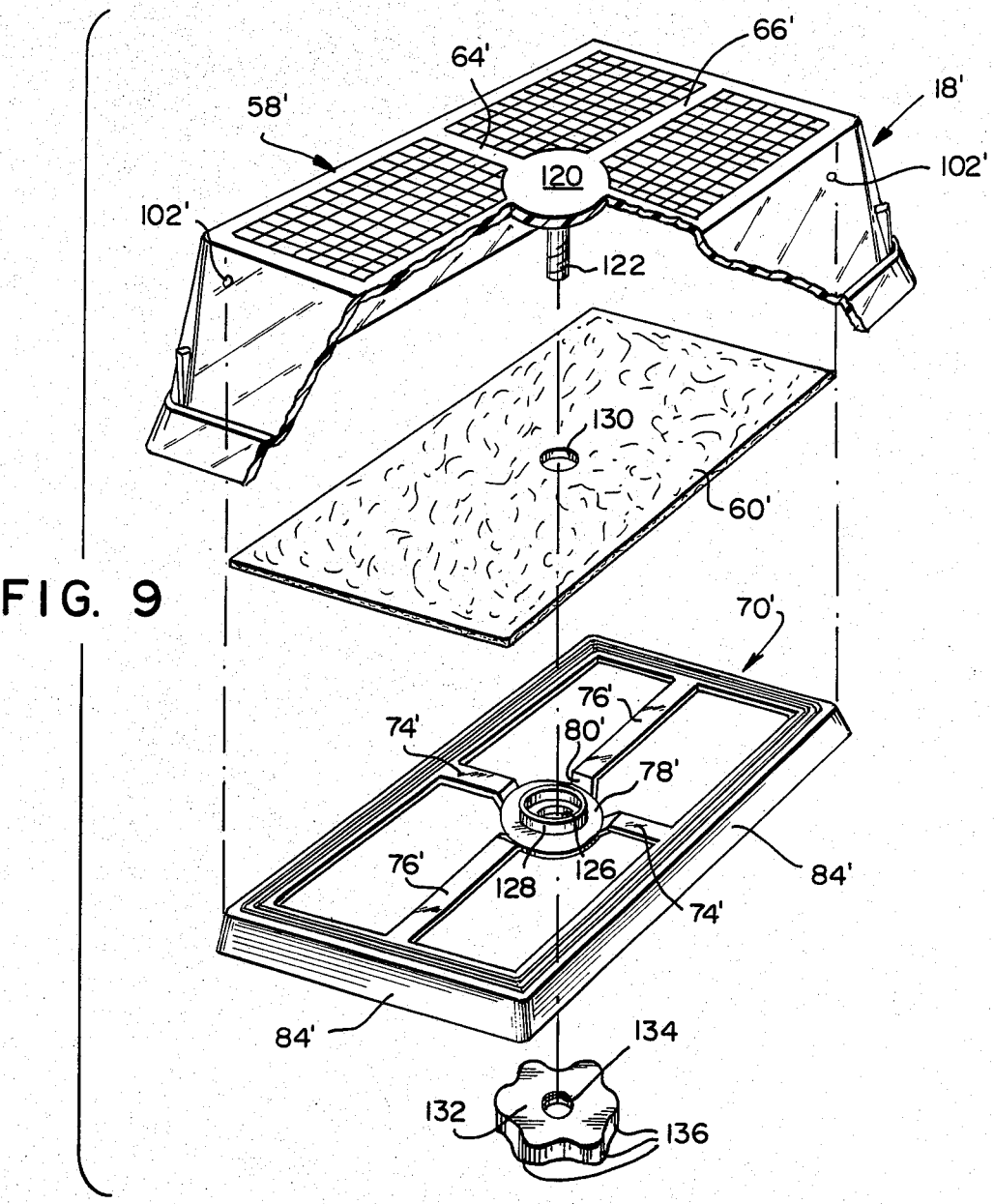
FIG. 9 is an exploded perspective view of a modified embodiment of the cap lid, with portions thereof broken away to reveal inner structural details.

When the filter cap 18 is assembled, the filter 60 is placed against the lower surface of the top wall 58, and the retainer member 70 is inserted into the filter cap in the manner shown in FIG. 6, and pressed into flush abutment against the filter 60. The ridges 88, 90, 92, 94 and 96 cause the filter to flex locally, and the ridge 88 projects between the ridges 92 and 94, while the ridge 90 projects between the ridges 94 and 96, as shown in FIG. 5. The ridges 88, 90, 92, 94 and 96 thus serve to hold the filter 60 securely in place.

As shown in FIG. 5, the bottom surface 100 of the perforated portion of the filter cap top wall is located slightly above the bottom surface 98 of the ledge 62, thereby allowing free passage of gases through the entire top surface of the mounted filter 60.

The retainer member 70 is held in place by means of small projections 102 which are integrally molded on the inner surface 86 of the filter cap body portion 38. As shown in FIGS. 1 and 3, three spaced projections 102 are molded on the side walls 40 of the body portion 38, and three spaced projections 102 are molded on the end walls thereof. Each of the projections 102 has a convex or arcuate free end, as shown in FIGS. 5 and 6.

The projections 102 are precisely positioned on the inner surface of the filter cap body portion 38 and are spaced from the bottom surface 98 of the filter cap ledge 62 by a distance slightly greater than the height of the integral peripheral flange 84 of the retainer member 70. In mounting the filter 60, therefore, when the retainer member 70 is moved upwardly within the filter cap body portion 38 toward the perforated tops wall thereof, the depending flange 84 engages the projections 102 and flexes inwardly so that it snaps past said projections to the mounted position shown in FIG. 5. In this mounted position, the bottom edge of the flange 84 rests upon the top surface of the projections 102 and is supported thereby, with the ridges 88 and 90 on the retaining member border portion engaging the under surface of the edge portion of the filter 60 and pressing this filter portion against the ridges 92, 94 and 96 of the filter cap ledge 62. At the same time, the cross arms 74, 76 of the retainer member 70 engage the bottom surface of the filter 60 at the interior thereof and press the filter firmly against the cross arms 64, 66 of the filter cap body portion. The filter is thus sandwiched between the retainer member 70 and the top wall 58 of the filter cap body portion 38, and is retained in this mounted position by the projections 102. The filter cap 18 can thus be lifted and removed from the animal cage 12 for all normal functions such as feeding, treating or examining the animals, without disturbing or dislodging the filter 106.

When it becomes necessary to replace the filter 60, the latter can be easily removed by simply grasping the circular central portion 78 of the retainer member 70 and pulling the retainer member away from the top wall 58 of the filter cap body portion 38. The retainer member flange 84 thus snaps over the projections 102, releasing the retainer member which is lifted out of the filter cap to expose the filter 60 which is removed and replaced. The retainer member 70 is then replaced and snapped into mounted position to support the new filter. It will thus be seen that the filter 60 can be changed with a minimum amount of time and effort, thereby minimizing the exposure of the animals to an unfiltered environment while the filter cap 18 is removed from the animal cage.

In the assembled filter cap 18, the perforated top wall 58 overlies the filter 60 in flush abutment therewith, to protect the filter against damage during handling and prevent its buckling, while the filter 60 rests flush upon the retainer member border portion 72 and cross arms 74, 76, which support it in mounted position.

In a commercial embodiment of the invention, the filter cap 18 is sized to fit upon a conventional transparent polycarbonate animal cage having a depth of approximately five inches, a top open end of approximately 11⅛ inches in length and 6⅞ inches in width. The body portion of filter cap 18 has a height of four inches, a perforated top wall 10⅛ inches in length and 5¾ inches in width, and a bottom open end (between the inner surface of peripheral flange 48) of 11 13/16 inches in length and 7½ inches in width. The filter 60 measures 10⅛ inches in length and 5¾ inches in width. The assembled filter cap 18 weighs fourteen ounces.

In use of the cage assembly 10, the floor of the cage 12 is covered with bedding material (not shown) and one or more animals such as mice are placed thereon. The lid or containment member 14, if desired, is then positioned on the cage lip 16 and food and water are provided in the respective compartments 26 and 30. The filter cap 18 is then positioned on the cage 12 in the manner shown in FIGS. 1 and 2, and remains securely in place until lifted off. In the mounted position of the filter cap 18, its lateral peripheral flange 46 rests upon the outer rim 22 of the containment member 14, which in turn is resting upon the lip 16, as shown in FIG. 2, to provide with the overhanging flange 48 an effective air seal for the interior of the cage assembly. If the lid 14 is not included in the cage assembly, the flange 46 would rest directly upon the lip 16 to provide the same air seal. Because of its dimensions, and because of its relatively heavy weight, the filter cap 18 rests flush and firmly on top of cage 12 providing a seal around the edges, and cannot be easily dislodged. When it is necessary to remove the filter cap 18 for feeding or treatment of the animals, the filter cap may be simply placed on a towel soaked in disinfectant to maintain the cleanliness of its rim portion.

The caging assembly 10 is sized to facilitate manipulation of the filter cap 18 with one hand. The perforated top wall 58 permits rough handling of the filter cap 18 without causing damage to the filter 60, and the entire filter cap can be autoclaved as a unit for continual reuse. Since the flange 48 closely envelopes the open top of cage 12, there is minimal loss of rack space when cages are in close proximity to each other and the abutting of one filter cap 18 against another filter cap is otherwise likely to dislodge the filter caps from their respective cages.

Since the filter cap 18 overlaps and encloses the cage 12 and fits snugly thereon, a giant petri dish-like structure is obtained. The overlapping filter cap effectively keeps dust particles, which are the microbiological taxis, out of the cage assembly. Accordingly the assembly 10 is essentially a miniature isolator, providing a protected microenvironment within any macroenvironment. The filter 60 while functioning as an effective microbiological barrier, permits a substantial interchange of gases therethrough, so that the animals receive a substantial supply of fresh air. Thus, the disclosed caging assembly effectively isolates small laboratory animals from their outside environments which may include airborne contaminants such as viruses, bacteria or any particulate matter. The cage assembly also prevents cross-contamination between cages by aiding in infection confinement. Thus the caging system is also a first-rate quarantine housing system because animals from different sources with differing microbiological profiles can be quarantined in the same room without cross-contamination. The barrier works in both directions. It can keep contaminants in or out. Thus, the cage assembly disclosed herein has the microbiological integrity of complex isolator.

In use of the filter cap 18, it has been found that, during the process of autoclaving, the retainer member 70 tends to contract under heat because of its shape-retaining memory, and such contraction causes the mounted retainer member to dislodge from the projections 102 and drop out of the filter cap body portion 38. To prevent this, there has been provided a modified embodiment of filter cap and retainer member, shown in FIGS. 9–12, which includes means for securely locking the retainer member in mounted position within the filter cap body portion.

The filter cap 18' of FIGS. 9–12 is generally similar in construction to the filter cap 18 of FIGS. 1–8, and like parts are identified by the same reference numerals in the "prime" series. In this embodiment, the cross arms 64' and 66' of the top wall 58' intersect at a central circular portion 120 formed with an integral depending cylindrical post 122 having external screw threading 124.

Figure 12:
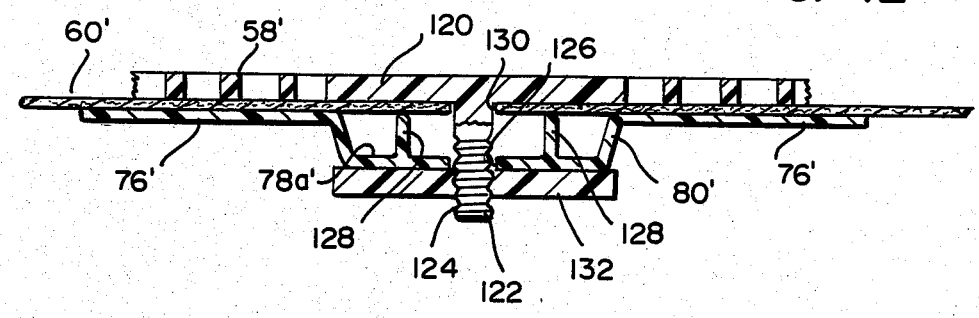
FIG. 12 is an enlarged section through the central portion of the assembled lid shown in FIG. 10.
Figure 10:
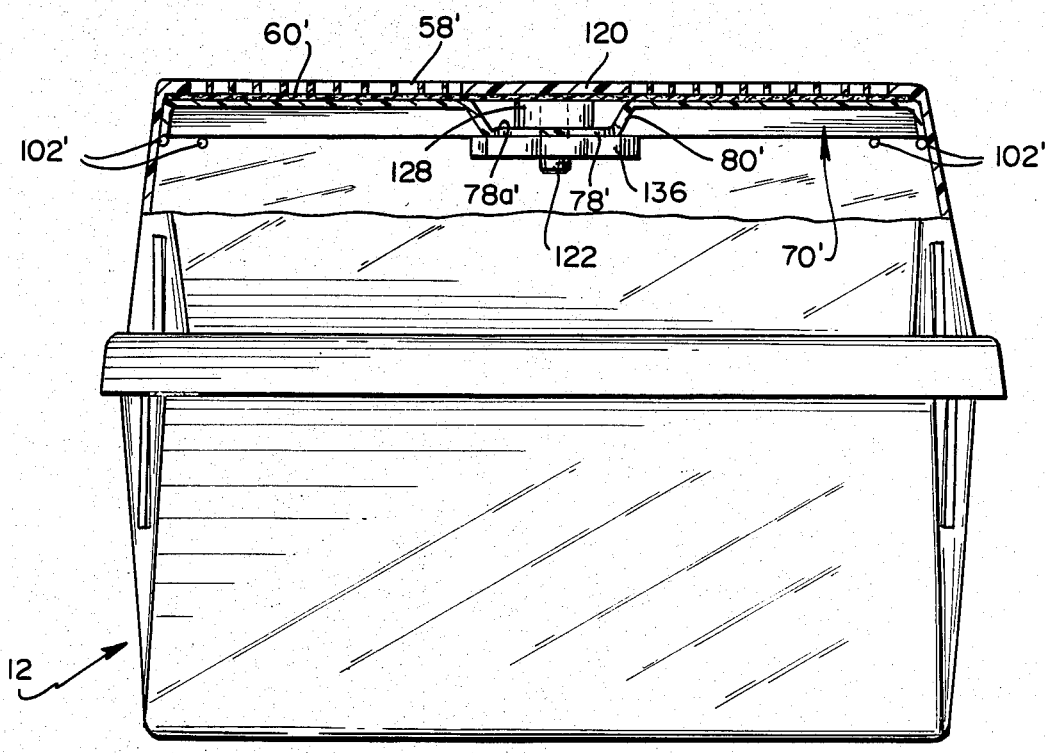
FIG. 10 is a side elevational view of the animal cage assembly, showing the lid embodiment of FIG. 9 mounted on the animal cage, with a portion thereof broken away and shown in section.
Figure 11:
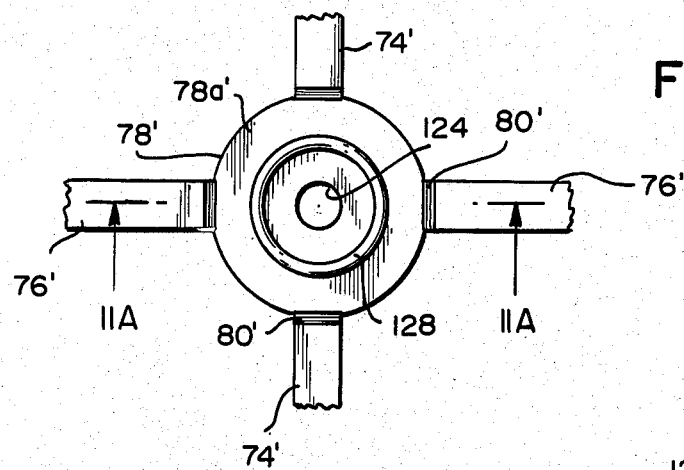
FIG. 11 is an enlarged top elevational view of the central portion of the retainer member shown in FIG. 9.
Figure 11A:
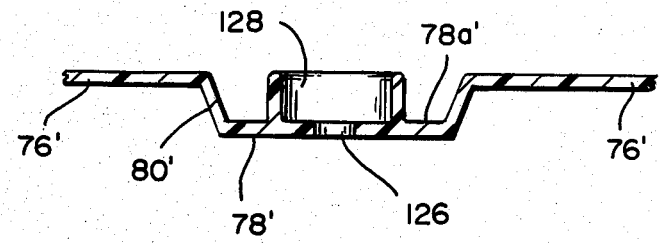
FIG. 11A is a sectional view taken along line 11A—11A of FIG. 11.

The retainer member 70' of FIGS. 9–12 is generally similar to the retainer member 70 of FIGS. 1–8, except that the recessed central circular portion 78' is provided with a circular aperture 126 and an annular flange 128 which surrounds said aperture. The diameter of the aperture 126 is slightly greater than the external diameter of the threaded post 122, so that it receives the latter loosely. The annular flange 128 is upstanding from the top surface 78a' of the circular portion 78', and is of such height that its top edge is on a plane with the top surfaces of the flat cross arms 74' and 76', as shown in FIGS. 11A and 12.

The filter 60' is identical to the filter 60 of FIGS. 1–8 and previously described, except that it is provided with a central circular aperture 130 sized to permit passage of the threaded post 122 snugly therethrough. There is also provided a circular nut 132 having a central threaded hole 134 sized to receive the cylindrical post 122, the nut 132 having circumferential projections 136 serving as finger grips.

In assembling the filter cap 18', the filter 60' is placed against the lower surface of the top wall 58' with the threaded post 122 extending through the aperture 130 of said filter, and the retainer member 70' is inserted into the interior of the filter cap and pressed into flush abutment against the filter 60'. The flange 84' of the retainer member engages and snaps past the projections 102' and is retained in mounted postion by the latter, as previously described. The circular nut 132 is now screwed upon the threaded post 122 and turned until it engages the lower surface of the retainer member circular portion 78'. Continued turning of the nut 132 forces the annular flange upwardly so that it presses the central portion of the filter 60' firmly against the central circular portion 120 of the cap top wall 58'. The retainer member 70' and the filter 60' are thus firmly locked in mounted position so that they cannot be accidentally dislodged during autoclaving or handling.

It has been found that cage assemblies as disclosed herein permit the maintenance of a limited stable flora, allow freedom of movement of animals within a colony and with minimal emission of odors. It has also been found that the ammonia level within the colony is not a problem if the population density per cage is kept at 3 to 4 mice, and bedding changed every 3 to 4 days, especially when relative humidity cannot be controlled. Ammonia can be totally eliminated from the colony if defined flora mice without urease-positive aerobic bacteria are used. Also by using a small amount of bedding which is stirred by the animals, the cage can be kept reasonably dry between changes.

While a preferred embodiment of the invention has been shown and described herein, it is obvious that numerous additions, changes and omissions may be made in said embodiment without departing from the spirit and scope of the invention.

What is claimed is:

1. A filter cap for an open-top animal cage, comprising:
   a rigid body portion sized to fit upon and cover over the open top of said cage, said body portion having continuous, unbroken side and end walls, a perforated top wall and an open bottom end,
   detachable air filter means extending across the entire perforated top wall of said filter cap body portion,
   flange means extending around the periphery of the open bottom end of said body portion and including a lateral flange portion sized and positioned to rest upon the top surface of said animal cage when the filter cap is inserted thereon, to effect a substantial peripheral seal between said filter cap and said cage, and a continuous rigid skirt portion depending from said lateral flange portion and sized to closely encompass the open top of said cage such that said filter cap overhangs said cage and cannot be dislodged therefrom,
   said air filter means comprising a sheet of filter material sized to fit closely within the upper end of said body portion against said perforated top wall,
   support means comprising a support member sized to fit closely within said filter cap and insertible through said open bottom end of said filter cap to a filter-retaining position in which it is flush against the under surface of said sheet of filter material with said sheet in a mounted position in which it is sandwiched between said support means and the perforated top wall and covers over the perforations of said top wall, and
   retaining means on the inner surfaces of at least some of said filter cap side and end walls for detachably securing said support member in said filter-retaining position,
   said retaining means being sized and positioned to engage the periphery of said support member with a snap fit when said support member is brought to its filter-retaining position.

2. A filter cap according to claim 1 which also includes means for locking said support means in its mounted position.

3. A filter cap according to claim 1 in which said support member includes a narrow border portion, said sheet of filter material being sandwiched between said border portion and the perforated top wall of said body portion.

4. A filter cap according to claim 3 in which said support member has a pair of cross arms extending between the interior of said border portion, said sheet of filter material being sandwiched between said cross arms and the perforated top wall of said body portion.

5. A filter cap according to claim 4 in which said support member further includes a grip portion connected to said cross arms and displaced from the plane of said cross arms.

6. A filter cap according to claim 5 which also includes means for mounting said support member in its mounted position.

7. A filter cap according to claim 6 in which said grip portion has an aperture formed therein, said filter cap having locking means including a threaded post depending from said top wall and extending through said aperture, and a nut rotatably mounted on said threaded post and underlying said grip portion.

8. A filter cap according to claim 7 in which said grip portion has an annular flange upstanding therefrom and surrounding said aperture, said flange being sized and positioned to engage the central portion of said sheet of filter material and press the latter against said top wall when said nut is tightened on said threaded post.

9. A filter cap according to claim 1 further including projecting ridge means integrally formed on said body portion and on said support means for gripping said sheet of filter material.

10. A filter cap according to claim 1 in which said body portion and said support means are each formed of a transparent plastic material.

11. A filter cap for an open-top animal cage, comprising:
    a rigid body portion sized to fit upon and cover over the open top of said cage, said body portion having continuous, unbroken side and end walls, a perforated top wall and an open bottom end,
    detachable air filter means extending across the entire perforated top wall of said filter cap body portion,
    flange means extending around the periphery of the open bottom end of said body portion and including a lateral flange portion sized and positioned to rest upon the top surface of said animal cage when the filter cap is inserted thereon, to effect a substantial peripheral seal between said filter cap and said cage, and a continuous rigid skirt portion depending from said lateral flange portion and sized to closely encompass the open top of said cage such that said filter cap overhangs said cage and cannot be dislodged therefrom,
    said air filter means comprising a sheet of filter material sized to fit closely within the upper end of said body portion against said perforated top wall,
    support means underlying and supporting said sheet of filter material in a mounted position in which said sheet is sandwiched between said support means and the perforated top wall and covers over the perforations of said top wall,
    said support means comprising a retainer member having a narrow border portion, a peripheral flange depending from said border portion, and a pair of cross arms extending between the interior of said border portion, said sheet of filter material being sandwiched between said cross arms and the perforated top wall of said body portion, and a plurality of projections formed integrally on said body portion and positioned to engage said flange for detachably securing said support means to said body portion with said support means pressing said sheet of filter material firmly against said perforated top wall.

12. A filter cap according to claim 11 which also includes means for locking said support means in its mounted position.

13. A filter cap according to claim 11 in which said retainer member further includes a grip portion connected to said cross arms and displaced from the plane of said cross arms.

14. A filter cap according to claim 13 in which said grip portion has an aperture formed therein, said locking means including a threaded post depending from said top wall and extending through said aperture, and a nut rotatably mounted on said threaded post and underlying said grip portion.

15. A filter cap according to claim 14 in which said grip portion has an annular flange upstanding therefrom and surrounding said aperture, said flange being sized and positioned to engage the central portion of said sheet of filter material and press the latter against said top wall when said nut is tightened on said threaded post.

16. A filter cap according to claim 11 further including projecting ridge means integrally formed on said body portion and on said support means for gripping said sheet of filter material.

17. A filter cap according to claim 11 in which said body portion and said support means are each formed of a transparent plastic material.

* * * * *